3,168,556
POLYHALOCYCLOALKENYL DERIVATIVES
OF ABIETIC ACID
John P. Luvisi, Park Ridge, Ill., assignor to Universal Oil Products Company, Des Plaines, Ill., a corporation of Delaware
No Drawing. Filed Nov. 8, 1961, Ser. No. 150,890
5 Claims. (Cl. 260—514.5)

This application is a continuation-in-part of my copending application Serial Number 763,448, filed September 26, 1958, now abandoned.

This invention relates to a process for preparing halo substituted polycyclic compounds and more particularly to a process for preparing halo substituted cyclic derivatives of polycyclic organic acids.

It is an object of this invention to prepare compositions of matter possessing insecticidal activity by condensing a polycyclic organic acid with a halo substituted unsaturated compound.

A further object of this invention is to prepare compositions of matter possessing insecticidal activity by condensing a polycyclic organic acid with a polychloro substituted alkadiene or cycloalkadiene.

Taken in its broadest aspect one embodiment of this invention resides in new compositions of matter comprising polyhalocycloalkenyl derivatives of abietic acid.

A further embodiment of this invention resides in a hexahalobicycloheptenyl derivative of abietic acid.

A specific embodiment of this invention is found in a hexachlorobicycloheptenyl derivative of abietic acid.

Other objects and embodiments will be found in the following detailed description of this invention.

Halo substituted alkadiene or halo substituted cycloalkadiene derivatives of abietic acid will find particular use in the chemical field as insecticides as well as fungicides, algaecides, and herbicides. For example, the condensation product which results from the reaction between abietic acid and hexachlorocyclopentadiene will be used effectively as an insecticide, especially against houseflies. In addition, the reaction products of this invention may also find uses as intermediates in the preparation of resins, pharmaceuticals, plastics, etc. For purposes of this invention the term "halo substituted alkadiene" and "halo substituted cycloalkadiene" will refer to both mono- and polyhalo compounds. Furthermore, the term "polyhalocycloalkenyl" as used hereinafter in the specification and appended claims will refer to both monocyclo- and bicyclo-compounds.

As hereinbefore set forth the present invention relates to a process for preparing halo substituted polycyclic compounds by reacting a halo substituted alkadiene or halo substituted cycloalkadiene with abietic acid. The abietic acid which is used in the process of this invention is in equilibrium with levopimaric acid. Therefore, an example of the process of this invention could be illustrated by the following equation in which abietic acid is condensed with hexachlorocyclopentadiene to form the isomeric hexachlorobicyclo-[2.2.1]-2-heptenyl derivatives of abietic acid.

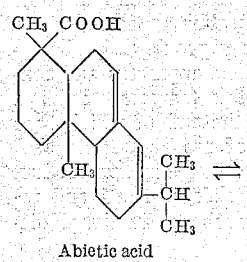

Abietic acid

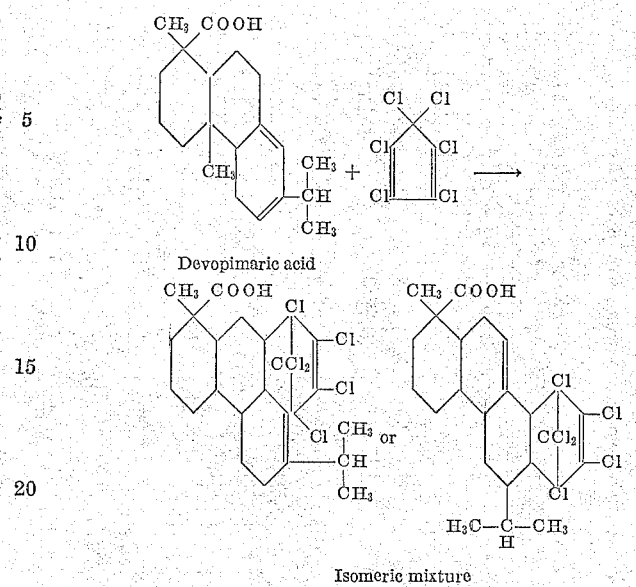

Devopimaric acid

Isomeric mixture

Unsaturated compounds containing a halogen substituent which may be reacted with the abietic acid-levopimaric acid equilibrium mixture in the process of the present invention include straight-chain diolefins having the general formula:

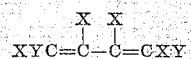

in which X is independently selected from the group consisting of hydrogen, alkyl, haloalkyl or halogen radicals having an atomic weight of from 35 to 127 (i.e., chlorine, bromine or iodine), at least one X being halogen or haloalkyl and Y is independently selected from the group consisting of alkyl, haloalkyl, and hydrogen radicals; or polyhalocycloalkadienes having the general formula:

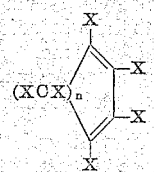

in which X has the same meaning as above and $n$ is 1 or 2. Examples of these compounds include haloalkadienes such as 1- and 2-chloro-1,3-butadiene,
1,3- or 2,3- and 1,4-dichloro-1,3-butadiene,
1- and 2-bromo-1,3-butadiene,
1,3-, 2,3- and 1,4-dibromo-1,3-butadiene,
1,3-, 2,3- and 1,4-diiodo-1,3-butadiene,
1,2,3-trichloro-1,3-butadiene,
1,2,3-tribromo-1,3-butadiene,
1- and 2-iodo-1,3-butadiene,
1,2-diiodo-1,3-butadiene,
1,2,3-triiodo-1,3-butadiene,
1,2,4-trichloro-1,3-butadiene,
1,2,4-tribromo-1,3-butadiene,
1,2,4-triiodo-1,3-butadiene,
1,2,3,4-tetrachloro-1,3-butadiene,
1,2,3,4-tetrabromo-1,3-butadiene,
1,2,3,4-tetraiodo-1,3-butadiene,
1,3-dichloro-2-methyl-1,3-butadiene,
1,4-dichloro-2-methyl-1,3-butadiene,
1,3,4-trichloro-2-methyl-1,3-butadiene,
1,4-dichloro-2-chloromethyl-1,3-butadiene,
1,4-dichloro-2-dichloromethyl-1,3-butadiene,
1,3-dibromo-2-methyl-1,3-butadiene, 1,4-dibromo-2-methyl-1,3-butadiene,
1,4-dibromo-2-bromomethyl-1,3-butadiene,
1,4-dibromo-2-dibromomethyl-1,3-butadiene,
1,3,4-tribromo-2-methyl-1,3-butadiene,
1,3-diiodo-2-methyl-1,3-butadiene,
1,4-diiodo-2-methyl-1,3-butadiene,
1,4-diiodo-2-iodomethyl-1,3-butadiene,
1,4-diiodo-2-diiodomethyl-1,3-butadiene,
1,3,4-triiodo-2-methyl-1,3-butadiene, etc.;

and halocycloalkadienes such as halogenated 1,3-cyclopentadienes which for purposes of this invention will be designated as halogenated cyclopentadienes including 1-chlorocyclopentadiene, 1,2- and other dichlorocyclopentadienes, 1,2,3- and other trichlorocyclopentadienes, 1,2,3,4- and other tetrachlorocyclopentadienes, 1,2,3,4,5- and other pentachlorocyclopentadienes, hexachlorocyclopentadiene, the corresponding bromo- and iodo-derivatives, etc. It is also contemplated within the scope of this invention that polyhalo substituted conjugated cyclohexadienes such as 1,2-dichloro-1,3-cyclohexadiene, 1,2,3-trichloro-1,3-cyclohexadiene, octachloro-1,3-cyclohexadiene, etc., 1,2-dibromo - 1,3 - cyclohexadiene, 1,2,3 - tribromo - 1,3-cyclohexadiene, octabromo-1,3-cyclohexadiene, 1,2-diiodo-1,3-cyclohexadiene, 1,2,3-triiodo-1,3-cyclohexadiene, octaiodo-1,3-cyclohexadiene, etc., may also be used. Furthermore, it is contemplated within the scope of this invention that fluorine analogs of the aforementioned unsaturated compounds such as hexafluorocyclopentadiene or 2,3-difluoro-1,3-butadiene may also be used, although not necessarily with equivalent results. Generally speaking the iodine, bromine and chlorine containing compounds are preferred because of their relatively greater availability and lower cost. In addition, it is also contemplated that polyhaloalkadienes and polyhalocycloalkadienes which are used in this process may contain more than one species of halo substituents, such as, for example, 1,2-dichloro-3-bromo-1,3-butadiene,
1-chloro-3-bromo-1,3-butadiene,
1-iodo-3-chloro-1,3-butadiene,
2-bromo-3-chloro-1,3-butadiene,
1,4-dichloro-2-bromomethyl-1,3-butadiene,
1,4-dichloro-2-iodomethyl-1,3-butadiene,
1-chloro-2-bromocyclopentadiene,
1,2-dichloro-3-bromocyclopentadiene,
1,2-dichloro-5,5-dibromocyclopentadiene, etc., although not necessarily with equivalent results.

Generally speaking the process of this invention will be effected at elevated temperatures in the range of from about 100° to about 200° C. or more. In the preferred embodiment of the invention the reaction is effected in the presence of an inert organic diluent. Therefore, the temperature of the reaction is controlled by the reflux temperature of the particular diluent used. Examples of these diluents include aromatic compounds such as benzene, toluene, o-, m- and p-xylene, ethyl benzene, etc.; saturated aliphatic and cycloaliphatic hydrocarbons such as pentane, hexane, heptane, etc., cyclopentane, cyclohexane, cycloheptane, methylcyclopentane, ethylcyclopentane, ethylcyclohexane, methylcyclohexane, etc. For example, when benzene is used the reaction will take place at a temperature in the range of from about 75° to about 90° C.; when toluene is used the reaction will be effected at a temperature of from about 100° to about 120° C., or when m-xylene is used the reaction is effected at a temperature in the range of from about 130° to about 150° C. etc.

The physical properties of the polyhalocycloalkenyl or polyhalobicycloalkenyl derivatives of abietic acids and the effects they have on entomological forms of life make them particularly desirable as insecticides, insect repellants and also plant growth, regulators, the particular compounds having many of the features desired of materials for this purpose. They are, for example, toxic to insects which are destructive of plant life and materials normally subject to insect infestation, their toxic effects being manifested by contact of the poison with the insect. The insecticides comprising the present compounds are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin, beeswax, etc.; a high molecular weight alcohol or ether such as myricyl alcohol, dibutyl ether, etc.; or they may be emulsified with water or combined with an oil and emulsified with water by the addition of an emulsifying agent, such as a surface active agent, to the mixture of components. The latter solvents and dispersants may also be employed for the specific purpose of reducing the concentration of insecticide to the desired level in a specific insecticide formulation. The particular formulation of active components in combination with the solvent or dispersant will depend upon its application. Compositions containing as high as 20% of active component may be preferred in some instances where deep penetration of the insecticide is desired, as in the treatment of fibrous material, for example, wood termites. For other purposes, the required concentration of active components in the formulation may be as low as 0.1%, as for example in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, etc., and the resulting solution atomized by a suitable spraying device.

The process of this invention may be effected in any suitable manner and may comprise either a batch or a continuous type operation. For example, when a batch type operation is used a quantity of the starting materials comprising the abietic acid and the halo substituted alkadiene or cycloalkadiene is placed in an appropriate condensation apparatus provided with heating and stirring means and a reflux condenser. The selected organic diluent is also placed in the condensation apparatus which is thereafter sealed and heated to approximately the reflux temperature of the diluent. The apparatus and contents thereof are maintained at this temperature for a predetermined residence time, at the end of which time the apparatus and contents thereof are allowed to cool to room temperature. The desired condensation product is separated from unreacted materials, purified and recovered by conventional means such as fractional distillation, crystallization, etc.

The process of the present invention may also be effected in a continuous type operation. In this type of operation the starting materials are continuously charged to a reactor which is maintained at the desired operating conditions of temperature and pressure. If so desired the reactants may be charged through separate lines or may be admixed prior to entry into said reactor and charged thereto in a single stream. The reactor may comprise an unpacked vessel or coil or may be lined with an absorbent packing material such as fire brick, dehydrated bauxite, alumina and the like. In addition the inorganic diluent is also charged to said reactor through separate lines or said diluent may be admixed with one or both of the starting materials before entry into said reactor and charged thereto in a single stream. After a predetermined residence time has been completed the condensation product is continuously withdrawn, separated from the reactor effluent, purified and recovered by the conventional means hereinbefore set forth, while the unreacted starting materials may be separated and recycled to form a portion of the feed stock.

The following examples are given to illustrate the process of the present invention, which, however, are not intended to limit the generally broad scope of the present invention in strict accordance therewith.

*Example I*

A solution of 30.2 g. (0.1 mole) of abietic acid and 27.3 g. (0.1 mole) of hexachlorocyclopentadiene in about 51 g. of toluene was heated under reflux at a temperature of about 121° C. for about 3 hours after which time the toluene was gradually distilled off thus permitting the temperature of the solution to rise. After approximately 45 g. of toluene was removed during a period of about 4 hours the temperature rose to about 170° C. The solution was then heated for an additional period of 30 minutes without any further removal of toluene, after which the product was allowed to cool, then taken up in pentane, washed with water, dried and subjected to fractional distillation at reduced pressure. Only 3 g. of unreacted hexachlorocyclopentadiene was removed. Fifty grams of the desired adduct, comprising the isomeric hexachlorobicycloheptenyl derivatives of abietic acid was separated and recovered as a viscous oil.

*Example II*

A solution of 30.2 g. (0.1 mole) of abietic acid and 54.0 g. (0.1 mole) of hexabromocyclopentadienyl in 50 g. of benzene is heated under reflux conditions (at a temperature of about 80°–85° C.) similar to that set forth in Example I above for a period of about 6 hours, at the end of which time the product is allowed to cool. The reaction product is taken up in pentane, washed with water, dried and subjected to fractional distillation, the desired adduct comprising the isomeric hexabromobicycloheptenyl derivatives of abietic acid being recovered therefrom.

*Example III*

A solution of 12.3 g. (0.1 mole) of 1,4-dichloro-1,3-butadiene and 30.2 g. (0.1 mole) of abietic acid in 50 g. of o-xylene is heated under reflux conditions for a period of about 6 hours, after which the product is recovered in a manner similar to that set forth in Examples I and II above. The condensation product comprising the isomeric dichlorocylohexenyl derivative of abietic acid is separated and recovered.

*Example IV*

A solution of 21.2 g. (0.1 mole) of 1,4-dibromo-1,3-butadiene and 30.2 g. (0.1 mole) of abietic acid in 50 g. of toluene is treated in a manner similar to that set forth in the above examples. The desired adduct comprising the isomeric dibromocyclohexenyl derivative of abietic acid is separated and recovered.

*Example V*

An insecticidal composition is prepared by dissolving 1 g. of the isomeric hexachlorobicycloheptenyl derivative of abietic acid in 2 cc. of benzene and adding 100 cc. of water using Triton X–100 as an emulsifying agent. The resulting solution is sprayed into a cage containing common houseflies and causes a 100% knock-down and eventual kill.

Similar tests of other insecticides of Examples II, III and IV show that these compounds, like those of Example I will exhibit an effective knock-down ability with essentially equal killing power.

I claim as my invention:

1. A polyhalocycloalkenyl derivative of abietic acid resulting from the condensation of abietic acid at a temperature of from about 100° C. to about 200° C. with a halogen-containing unsaturated hydrocarbon selected from the group consisting of polychloro-butadiene, polybromo-butadiene, polychloro-alkylbutadiene, polybromo-alkylbutadiene, polychlorocyclopentadiene, polybromocyclopentadiene, polychlorocyclohexadiene and polybromocyclohexadiene.

2. A hexachlorobicycloheptenyl derivative of abietic acid resulting from the condensation of abietic acid with hexachlorocyclopentadiene at a temperature in the range of from about 100° to about 200° C.

3. A hexabromobicycloheptenyl derivative of abietic acid resulting from the condensation of abietic acid with hexabromocyclopentadiene at a temperature in the range of from about 100° to about 200° C.

4. A dichlorocyclohexenyl derivative of abietic acid resulting from the condensation of abietic acid with 1,4-dichloro-1,3-butadiene at a temperature in the range of from about 100° to about 200° C.

5. A dibromocyclohexenyl derivative of abietic acid resulting from the condensation of abietic acid with 1,4-dibromo-1,3-butadiene at a temperature in the range of from about 100° to about 200° C.

References Cited in the file of this patent

UNITED STATES PATENTS

| | | |
|---|---|---|
| 2,598,424 | Peters | May 27, 1952 |
| 2,606,910 | Herzfeld et al. | Aug. 12, 1952 |

OTHER REFERENCES

Norton: "Chemical Reviews," vol. 31, October 1942, pp. 319–523.

Houben-Weyl: "Methoden der Org. Chemie," 4th Edition, pages 982–987 (1952).

Berger et al.: "Chem. Abstracts," vol. 49 (1955), page 15751.

Reimschneider et al.: "Chem. Abstracts," vol. 50 (1956), page 4883.